(12) United States Patent
Pavlovic et al.

(10) Patent No.: US 11,706,320 B2
(45) Date of Patent: Jul. 18, 2023

(54) SCALABLE LEADER-BASED TOTAL ORDER BROADCAST PROTOCOL FOR DISTRIBUTED COMPUTING SYSTEMS

(71) Applicant: International Business Machines Corporation, Armonk, NY (US)

(72) Inventors: Matej Pavlovic, Adliswil (CH); Chrysoula Stathakopoulou, Zurich (CH); Marko Vukolić, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 17/303,477

(22) Filed: May 28, 2021

(65) Prior Publication Data

US 2022/0385744 A1    Dec. 1, 2022

(51) Int. Cl.
*H04L 69/00* (2022.01)
*H04L 67/10* (2022.01)
*H04L 12/18* (2006.01)

(52) U.S. Cl.
CPC .............. *H04L 69/02* (2013.01); *H04L 12/18* (2013.01); *H04L 67/10* (2013.01)

(58) Field of Classification Search
None
See application file for complete search history.

(56) References Cited

U.S. PATENT DOCUMENTS

| 6,671,821 | B1 | 12/2003 | Castro |
| 8,230,253 | B2 | 7/2012 | Butterworth |
| 2002/0129087 | A1 | 9/2002 | Cachin |
| 2018/0219946 | A1* | 8/2018 | Farrahi Moghaddam ................... H04L 67/1095 |
| 2019/0020629 | A1 | 1/2019 | Baird, III |
| 2019/0273610 | A1 | 9/2019 | Fan |
| 2020/0074440 | A1* | 3/2020 | Fullman .............. G06Q 20/401 |
| 2020/0351111 | A1 | 11/2020 | Lucco |
| 2020/0379852 | A1 | 12/2020 | Yang |
| 2021/0014042 | A1* | 1/2021 | Sivathanu ............. H04L 9/0637 |
| 2021/0073075 | A1* | 3/2021 | Zhuo ..................... G06F 11/182 |
| 2022/0058549 | A1 | 2/2022 | Cutts |

OTHER PUBLICATIONS

"SAREK: Optimistic Parallel Ordering in Byzantine Fault Tolerance", Li et al., 2016 12th European Dependable Computing Conference. (Year: 2016).*
"A Multi-leader Approach to Byzantine Fault Tolerance", Abid, KTH Royal Institute of Technology. (Year: 2015).*

(Continued)

*Primary Examiner* — Schquita D Goodwin
*Assistant Examiner* — Jonathan A Sparks
(74) *Attorney, Agent, or Firm* — Michael A. Petrocelli

(57) ABSTRACT

A Byzantine fault-tolerant distributed computing system of nodes configured to process client requests, executes a leader-based total order broadcast (LBTOB) protocol. The computing system concurrently executes multiple instances of the LBTOB protocol at the nodes, on respective disjoint partitions of the client requests, and the disjoint partitions are assigned to the instances using a deterministic function of a state of the system. The computing system multiplexes outputs of the executing instances in an ordered log of the client requests, and the ordered log is maintained at each of the nodes.

18 Claims, 7 Drawing Sheets

(56) References Cited

OTHER PUBLICATIONS

"A Byzantine Fault-Tolerant Ordering Service for the Hyperledger Fabric Blockchain Platform", Sousa et al., 2018 48th Annual IEEE/IFIP International Conference on Dependable Systems and Networks. (Year: 2018).*

Abid, Muhammad Zeeshan, "A Multi-leader Approach to Byzantine Fault Tolerance", Master of Science Thesis, KTH Royal Institute of Technology, Stockholm, Sweden, Jul. 1, 2015, 115 pages, <http://www.diva-portal.se/smash/get/diva2:838919/FULLTEXT01.pdf>.

Abraham, et al., "Solida: a Blockchain Protocol Based on Reconfigurable Byzantine Consensus", arXiv:1612.02916v2, Nov. 18, 2017, 17 pages.

Aguilera, et al., "Reconfiguring Replicated Atomic Storage: a Tutorial", Bulletin of the EATCS, No. 102, Oct. 2010, pp. 84-108.

Androulaki, et al., "Hyperiedger Fabric: a Distributed Operating System for Permissioned Blockchains", EuroSys 18: Proceedings of the Thirteenth EuroSys Conference, Apr. 2018, Article No. 30, 15 pages, <https://dl.acm.org/doi/10.1145/3190508.3190538>.

Avarikioti, et al., "FnF-BFT: Exploring Performance Limits of BFT Protocols", arXiv:2009.02235v1,Sep. 4, 2020, 15 pages, <https://arxiv.org/pdf/2009.02235.pdf>.

Azouvi, et al., "Winkle: Foiling Long-Range Attacks in Proof-of-Stake Systems", © 2020 Association for Computing Machinery, New-York '20, Oct. 21-23, 2020, New-York, NY, pp. 189-201.

Cachin, et al., "Introduction to Reliable and Secure Distributed Programming", Springer Publishing Company, Feb. 2011, Abstract Only, 1 page, <https://dl.acm.org/doi/book/10.5555/1972495>.

Cachin, et al., "Secure and Efficient Asynchronous Broadcast Protocols", Cryptology ePrint Archive: Report 2001/006, Mar. 7, 2001, 49 pages, <https://eprint.iacr.org/2001/006>.

Castro, et al., "Practical Byzantine Fault Tolerance and Proactive Recovery", ACM Transactions on Computer Systems, vol. 20, No. 4, Nov. 2002, pp. 398-461.

Coelho, et al., "Byzantine Fault-Tolerant Atomic Multicast", 48th Annual IEEE/IFIP International Conference on Dependable Systems and Networks (DSN), 2018, 12 pages, <https://ieeexplore.ieee.org/document/8416469>.

Crain, et al., "DBFT: Efficient Leaderless Byzantine Consensus and its Application to Blockchains", 2018 IEEE 17th International Symposium on Network Computing and Applications (NCA), 8 pages, <https://ieeexplore.ieee.org/document/8548057>.

Deirmentzoglou, et al., "A Survey on Long-Range Attacks for Proof of Stake Protocols", IEEE Access, vol. 7, 2019, pp. 28712-28725, <https://ieeexplore.ieee.org/document/8653269>.

Dolev, et al., "Bounds on information exchange for Byzantine agreement", Journal of the ACM, Jan. 1985, p. 132-140, <https://www.researchgate.net/publication/220431204_Bounds_on_Information_Exchange_for_Byzantine_Agreement>.

Duan, et al., "BChain: Byzantine Replication with High Throughput and Embedded Reconfiguration", UC Davis Previously Published Works, 2014, 16 pages, <https://escholarship.org/uc/item/5ht7n9d4>.

Duan, et al., "BEAT: Asynchronous BFT Made Practical", CCS '18: Proceedings of the 2018 ACM SIGSAC Conference on Computer and Communications Security, Oct. 2018, pp. 2028-2041, <https://dl.acm.org/doi/10.1145/3243734.3243812>.

Duan, et al., "Secure Causal Atomic Broadcast, Revisited", in 47th Annual IEEE/IFIP International Conference on Dependable Systems and Networks, DSN 2017, 12 pages.

Gupta, et al., "RCC: Resilient Concurrent Consensus for High-Throughput Secure Transaction Processing", arXiv:1911.00837v2, Nov. 2, 2020, 13 pages, <https://arxiv.org/abs/1911.00837>.

Kuznetsov, et al., "Asynchronous Reconfiguration with Byzantine Failures", arXiv:2005.13499v2, Aug. 12, 2020, 37 pages, <https://drops.dagstuhl.de/opus/volltexte/2020/13105/>.

Lamport, et al., "The Byzantine generals problem", ACM Transactions on Programming Languages and Systems, Jul. 1982, pp. 382-401, <https://dl.acm.org/doi/10.1145/357172.357176>.

List of IBM Patents or Patent Applications Treated as Related. Filed Herewith. 2 pages.

Liu, et al., "Scalable Byzantine Consensus via Hardware-assisted Secret Sharing", IEEE Transactions on Computers, vol. 68, Issue: 1, Jul. 25, 2018, 15 pages, <https://ieeexplore.ieee.org/document/8419336>.

Madsen, et al., "Transforming Byzantine Faults using a Trusted Execution Environment", 2019 European Dependable Computing Conference (EDCC), pp. 63-70, <https://ieeexplore.ieee.org/abstract/document/8893314>.

Markham, Jerry, "Front-Running—Insider Trading Under the Commodity Exchange Act", Catholic University Law Review, 1988, vol. 38:69, pp. 69-127.

Mell, et al., "The NIST Definition of Cloud Computing", National Institute of Standards and Technology, Special Publication 800-145, Sep. 2011, 7 pages.

Milosevic, et al., "Bounded Delay in Byzantine Tolerant State Machine Replication", Proceedings of the IEEE Symposium on Reliable Distributed Systems, Sep. 2013, 15 pages.

Moser, et al., "Byzantine-Resistant Total Ordering Algorithms", Information and Computation, vol. 150, Issue 1, Apr. 10, 1999, pp. 75-111, <https://www.sciencedirect.com/science/article/pii/S0890540198927705>.

Pavlovic, et al., "Managing Reconfigurations of Distributed Computing Systems", U.S. Appl. No. 17/303,479, filed May 28, 2021.

Poke, et al., "AllConcur: Leaderless Concurrent Atomic Broadcast (Extended Version)", arXiv:1608.05866v2, Apr. 21, 2017, 18 pages, <https://arxiv.org/pdf/1608.05866.pdf>.

Reiter, et al., "How to securely replicate services", ACM Transactions on Programming Languages and Systems (TOPLAS), vol. 16, Issue 3, May 1994, pp. 986-1009, <https://dl.acm.org/doi/10.1145/177492.177745>.

Soriente, et al., "ReplicaTEE: Enabling Seamless Replication of SGX Enclaves in the Cloud", 2019 IEEE European Symposium on Security and Privacy (EuroS&P), pp. 158-171, <https://ieeexplore.ieee.org/document/8806748>.

Spenger, Jonas, "Using Blockchain for Tamper-Proof Broadcast Protocols", Master's Thesis, Humboldt University of Berlin, May 2020, 91 pages, <https://opus4.kobv.de/opus4-zib/frontdoor/index/index/docId/7916>.

Stathakopoulou, et al., "Causal Total Order Broadcast Protocols Using Trusted Execution Environments", U.S. Appl. No. 17/303,478, filed May 28, 2021.

Stathakopoulou, et al., "Mir-BFT: High-Throughput BFT for Blockchains", arXiv:1906.05552v2, Sep. 24, 2019, 18 pages, <https://arxiv.org/abs/1906.05552>.

Stathakopoulou, et al., "Mir-BFT: High-Throughput Robust BFT for Decentralized Networks", arXiv:1906.055523, Jan. 22, 2021, 27 pages, <https://arxiv.org/abs/1906.05552>.

Steffenel, Luiz Angelo, "Fast and Scalable Total Order Broadcast for Wide-area Networks", HAL, 2006, 31 pages, <https://hal.inria.fr/inria-00116895v1/document>.

Steinhoff, Selma, "Secure Dynamic Reconfiguration for Byzantine Fault-Tolerant Distributed Systems", Master Thesis, IBM Research, Zurich, and System Security Group Institute of Information Security, Department of Computer Science, ETH Zurich, Sep. 2, 2020, 50 pages.

Vizier, et al., "ComChain: a blockchain with Byzantine fault-tolerant reconfiguration", Concurrency Computation Practice and Experience, Special Issue Paper, Oct. 23, 2019, 19 pages, <https://onlinelibrary.wiley.com/doi/abs/10.1002/cpe.5494>.

Wang, et al,. "LgTTBFT Effective Byzantine Fault Tolerance Algorithm Based on Structured Network and Trusted Execution Environment", EasyChair Preprint, No. 1713, Oct. 18, 2019, 15 pages, <https://easychair.org/publications/preprint/8sSP>.

Yadav, et al., "Formal Specifications and Verification of Message Ordering Properties in a Broadcasting System using Event B", University of Southampton, Southampton, United Kingdom, May 2007, 45 pages, <https://www.researchgate.net/publication/39995145_Formal_Specifications_and_Verification_of_Message_Ordering_Properties_in_a_Broadcasting_System_using_Event_B>.

Yin, et al., "HotStuff: BFT Consensus with Linearity and Responsiveness", Proceedings of the 2019 ACM Symposium on Principles

(56) References Cited

OTHER PUBLICATIONS of Distributed Computing, Jul. 2019, pp. 347-356, <https://www.researchgate.net/publication/334577305_HotStuff_BFT_Consensus_with_Linearity_and_Responsiveness>.
Correia, et al., "From Consensus to Atomic Broadcast: Time-Free Byzantine-Resistant Protocols without Signatures", the Computer Journal, vol. 49, No. 1, Jan. 2006, pp. 82-96, <https://www.researchgate.net/publication/220459271_From_Consensus_to_Atomic_Broadcast_Time-Free_Byzantine-Resistant_Protocols_without_Signatures>.

* cited by examiner

SCALABLE LEADER-BASED TOTAL ORDER BROADCAST PROTOCOL FOR DISTRIBUTED COMPUTING SYSTEMS

STATEMENT REGARDING FEDERALLY SPONSORED RESEARCH OR DEVELOPMENT

The project leading to this application has received funding from the European Union's Horizon 2020 research and innovation programme under grant agreement No 780477.

BACKGROUND

The invention relates in general to computer-implemented methods and computer program products for executing leader-based, total order broadcast protocols (LBTOB protocols) in Byzantine fault-tolerant, distributed computing systems (e.g., systems in which are able to function dependably when components have failed and reliable information about such failures may be not be available).

Leader-based consensus, state-machine replication (SMR) and total order broadcast (TOB) protocols are poorly scalable with the number of participating nodes. Despite recent progresses in reducing the overall message complexity of leader-based SMR/TOB protocols, the throughput scalability remains poor; it is typically inversely proportional to the number of nodes.

SUMMARY

According to a first aspect, the present invention is embodied as a method of executing a leader-based, total order broadcast protocol, or LBTOB protocol, in a Byzantine fault-tolerant, distributed computing system of nodes configured to process client requests. The method comprises concurrently executing multiple instances of the LBTOB protocol at the nodes, on respective disjoint partitions of the client requests. Remarkably, the disjoint partitions are assigned to respective instances using a deterministic function of the state of the system. The outputs of the executing instances are multiplexed in a single, totally ordered log of the client requests, where this log is maintained at each of the nodes. According to aspects of the invention, the method further includes mapping the client requests to subdomains of a domain of the requests, so as to obtain buckets of the client requests; and at each epoch of several epochs, distributing the obtained buckets of the client requests through said instances, using said deterministic function, so as to obtain the disjoint partitions of the client requests on which the respective instances concurrently execute. According to aspects of the invention, each position in the ordered log corresponds to a unique sequence number, which is assigned a respective one of the client requests, or a respective batch of the client requests, as a result of multiplexing said outputs of the executing instances; the method further comprises segmenting a portion of the log corresponding to said each epoch into non-overlapping segments of sequence numbers and assigning the segments to respective ones of the instances; and the obtained buckets are distributed through said instances by distributing the buckets through the assigned segments at said each epoch, so as to obtain said disjoint partitions of the client requests. According to aspects of the invention, the buckets of the client requests are distributed so as to prevent any one of the client requests, or batches thereof, from being associated with more than one of the sequence numbers in the ordered log. According to aspects of the invention, the deterministic function has two operands, including a first operand that depends on the state of the system at said each epoch and a second operand that depends on a nominal number of one of the buckets, the deterministic function being applied to one of the buckets at a time, whereby an output of the deterministic function corresponds to a nominal number of one of non-overlapping segments of said portion. According to aspects of the invention, distributing the obtained buckets comprises re-assigning the obtained buckets through the segments at said each epoch. According to aspects of the invention, the buckets are re-assigned by rotating them through the segments at said each epoch, so as to ensure that at least one of the segments assigned to a respective one of the instances with a correct leader is assigned client requests in each of the buckets throughout the several epochs. According to aspects of the invention, the buckets are rotated so as to ensure that each of the segments is assigned client requests in each of the buckets throughout the several epochs. According to aspects of the invention, the client requests are mapped to said subdomains using a hash function mapping input client requests to fixed-size values, where a number of the fixed-size values corresponds to a total number of the buckets. According to aspects of the invention, each of the multiple instances of the LBTOB protocol is executed according to a distributed computing primitive that is wrapped around the LBTOB protocol. According to aspects of the invention, the primitive is designed to handle said client requests as messages defined over said subdomains, whereby each of the messages corresponds to one of the client requests or a batch of requests of the client requests, and allow each of the instances of the LBTOB protocol to order, upon executing, messages belonging to a corresponding one of the subdomains and terminate after delivering a finite number of the messages in said corresponding one of the subdomains. According to aspects of the invention, a subdomain of each of the instances of the LBTOB protocol is extended to include a termination value. According to aspects of the invention, each position in the totally ordered log corresponds to a unique sequence number, and the primitive is further designed such that any correct node of said nodes is able, for each of the instances of the LBTOB protocol, to deliver one of the messages of the extended subdomain of this instance, such that each sequence number in the log will be assigned one of the messages of the extended subdomain of one of the instances. According to aspects of the invention, the primitive is further designed such that any message delivered by a correct node is a message of the extended domain of one of the instances. According to aspects of the invention, the primitive is further designed such that if two messages delivered by respective correct nodes of the nodes correspond to a same sequence number in the log, then the two messages are identical. According to aspects of the invention, the primitive is further designed such that no correct node of the nodes can deliver a same one of the messages for two or more different ones of the sequence numbers in the log. According to aspects of the invention, the primitive is further designed such that any broadcast message is a message that is eventually delivered by a correct node. According to aspects of the invention, the LBTOB protocol is one of the practical Byzantine fault tolerance protocol, and the Raft leader-based protocol.

In an embodiment, a system of executing a leader-based, total order broadcast (LBTOB) protocol, in a Byzantine fault-tolerant, distributed computing system of nodes configured to process client requests, which comprises: a computer system comprising a computer readable storage medium having program instructions embodied therewith, the program instructions executable by a computer to cause the computer to concurrently execute multiple instances of the LBTOB protocol at the nodes, on respective disjoint partitions of the client requests, wherein the disjoint partitions are assigned to said instances using a deterministic function of the state of the system, and multiplex outputs of the executing instances in a single, totally ordered log of the client requests, wherein the single log is maintained at each of the nodes.

In an embodiment, a computer program product for executing a leader-based, total order broadcast LBTOB protocol, in a Byzantine fault-tolerant, distributed computing system of nodes configured to process client requests, includes a computer readable storage medium having program instructions embodied therewith, the program instructions executable by one or more processors, to cause to: concurrently execute multiple instances of the LBTOB protocol at the nodes, on respective disjoint partitions of the client requests, wherein the disjoint partitions are assigned to said instances using a deterministic function of the state of the system, and multiplex outputs of the executing instances in a single, totally ordered log of the client requests, wherein the single log is maintained at each of the nodes.

The present solution allows leader-based protocols to be turned into leaderless protocols. The assignment of disjoint partitions of the client requests to respective instances does not depend on a primary node, which precludes the risk of wrongdoing by a faulty primary node. Thus, single-leader bottlenecks are avoided. Fairness can nevertheless be guaranteed by assigning buckets of client requests to different leaders throughout epochs, using a segmentation of the log, as in embodiments discussed herein.

The present approach may advantageously use a novel abstraction, i.e., a primitive, which can be implemented so as to maintain safety and liveness and prevent redundant data duplication. In addition, preferred constructions can provide constant amortized bit communication complexity per node in the synchronous case, which is the prevalent mode of protocol operation (even for protocols designed for partial synchrony). This allows the system to scale without impact on throughput.

According to another aspect, the invention is embodied as a computer program product for executing a LBTOB protocol in a distributed computing system of nodes a described above. The computer program product comprises a computer readable storage medium having program instructions embodied therewith, where the program instructions are executable by one or more processors to cause to take the steps of the above method.

Aspects of the invention are directed to methods that concurrently execute multiple instances of a LBTOB protocol on disjoint partitions of client requests, where the disjoint partitions are assigned to instances using a deterministic function of the state of the system.

Aspects of the present invention recognize and address scaling consensus and total-order broadcast (TOB) protocols, which are fundamental primitives in distributed computing. The relevant scalability here is with respect to the number of nodes (replicas) N in the system: intuitively, the throughput should remain as high as possible despite a growing number N of nodes. Blockchain system requirements led to focus on Byzantine fault-tolerant (BFT) protocols in the eventually synchronous (deterministic protocols) or fully asynchronous (randomized protocols) model with a high/optimal fault threshold $t=O(N)$, e.g., $t=\lfloor(N-1)/3\rfloor$.

Aspects of the present invention note and address that in such a model, the classical Dolev/Reischuk (DR) lower bound requires $\Omega(N^2)$ worst case message complexity, which is a focal complexity metric adopted in several subsequent protocols, including the recent HotStuff protocol. However, as the present Inventors have realized, the resulting message complexity seems to be a rather poor scalability metric, as demonstrated by the fact that the HotStuff protocol and other leader-based protocols scale inversely proportionally to the number of nodes, despite some of them matching the DR lower bound. Namely, in leader-based protocols, the leader has at least O(N) messages/bits to send, even in the common case, yielding 1/N throughput scalability.

Aspects of the invention recognize that there has been a recent effort to overcome the single leader bottleneck by allowing multiple parallel leaders in the classical Practical Byzantine fault tolerance (PBFT) protocol, demonstrating excellent scalability in practice. However, and as the present Inventors further realized, a drawback of this approach is that it multiplexes PBFT instances leveraging a single replica in the role of epoch primary, whereby the assignment of client requests depends on a primary node, which may be faulty.

Aspects of the present invention address the need for a new approach is needed to make leader-based protocols scale.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of a computerized system and parts thereof, as involved in embodiments. Similar or functionally similar elements in the figures have been allocated the same numeral references, unless otherwise indicated.

Computerized methods and computer program products embodying the present invention will now be described, by way of non-limiting examples.

DETAILED DESCRIPTION OF EMBODIMENTS OF THE INVENTION

The following description is structured as follows. First, general embodiments and high-level variants are described in section 1. Section 2 describes particularly preferred embodiments, while Section 3 is directed to technical implementation details. Note, the present method and its variants are collectively referred to as the "present methods". All references Sn refer to methods steps of the diagram and flowchart of FIGS. 3 and 4, respectively, while numeral references pertain to physical parts or components of the systems shown in FIG. 1 and the computerized unit shown in FIG. 5.

1. General Embodiments and High-Level Variants

In reference to FIGS. 1-4, an aspect of the invention is first described, which concerns a method of executing a leader-based total order broadcast protocol (hereafter LBTOB protocol) in a Byzantine fault-tolerant (BFT), distributed computing system 1.

Figure 1:
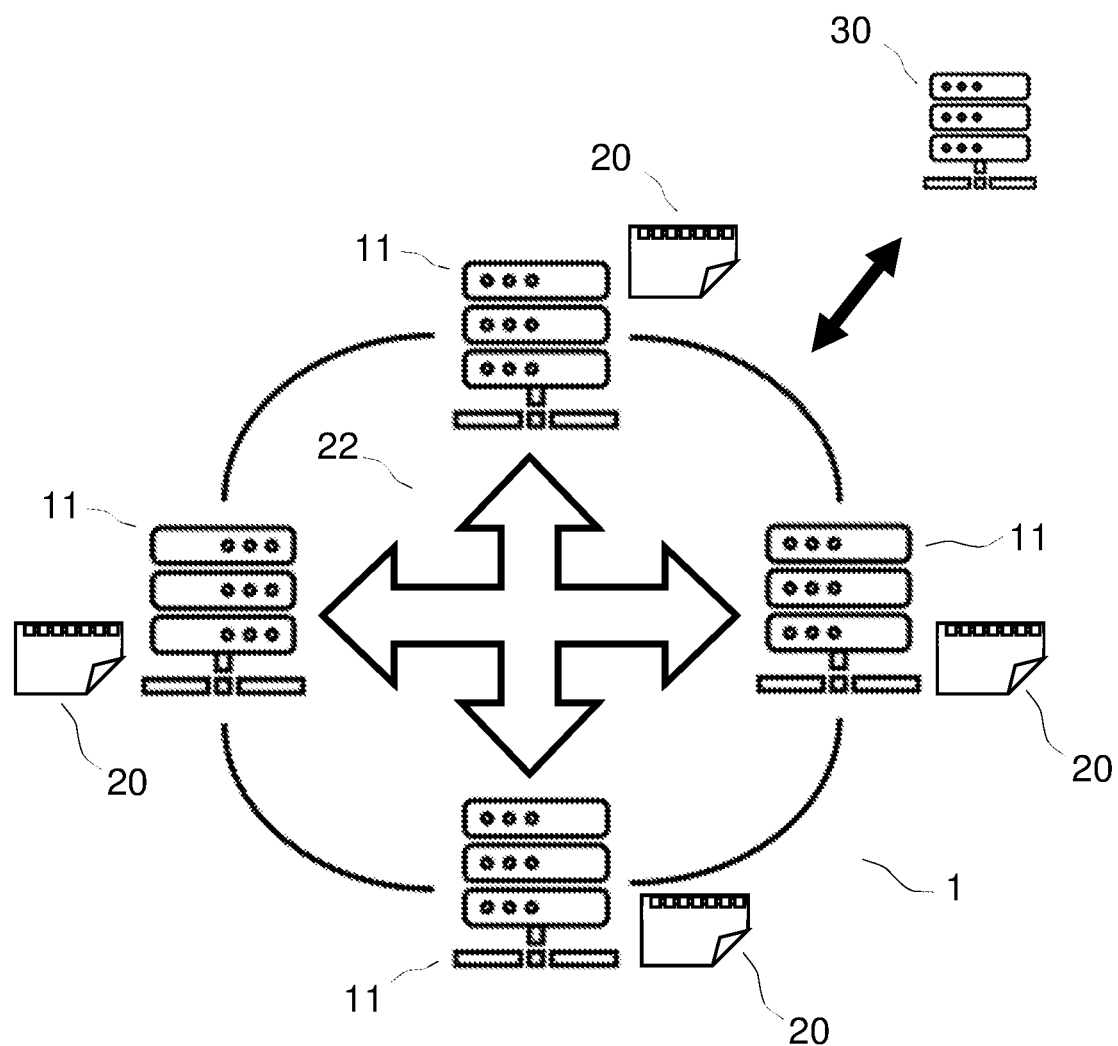
FIG. 1 is a diagram showing a distributed computing system interacting with a client, as in embodiments.

As illustrated in FIG. 1, the distributed computing system 1 comprises a network of nodes 11, which typically adhere to a given consensus protocol of the system 1. The system 1 is enabled by physical machines 11 (nodes) of the network, which runs a distributed computing method, as known per se. The network includes N nodes 11, where N is typically assumed to be equal to or larger than four, i.e., N≥4. In practice, the distributed system 1 is typically configured to tolerate at most f Byzantine nodes, where f<N/3. That is, at most f nodes in the network 1 can be Byzantine (i.e., fail in some way). The system 1 of nodes 11 is configured to process requests of clients, such as client 30 shown in FIG. 1. Only one such client is depicted in FIG. 1, for simplicity. In practice, however, many such clients may potentially interact with the system 1.

Figure 4:
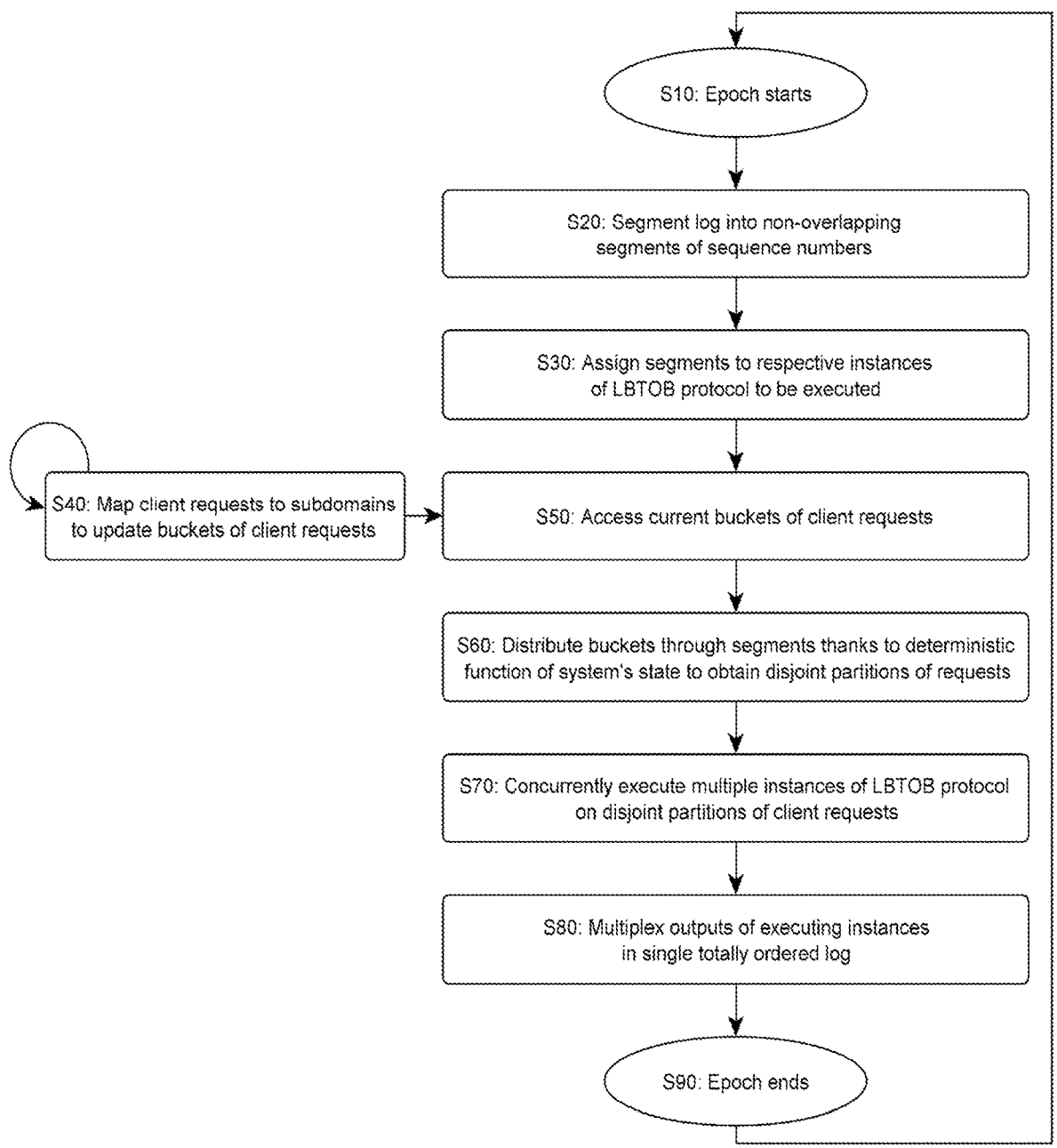
FIG. 4 is a flowchart illustrating high-level steps of a method of executing a leader-based, total order broadcast protocol in a Byzantine fault-tolerant, distributed computing system, according to embodiments.

As in the Mir-BFT approach, the present method causes concurrent execution of multiple instances of the LBTOB protocol at the nodes 11, see step S70 in the flowchart of FIG. 4. I.e., such instances execute in parallel at respective nodes 11 of the system 1. In the present case, however, such instances execute on respective disjoint partitions of the client requests, where the disjoint partitions are assigned (at step S60) to respective instances of the LBTOB protocol using a deterministic function of the state of the system 1. Any suitable deterministic function can be used to distribute subsets of the client requests through the protocol instances. Various types of such deterministic functions can be leveraged. In practice, this function will likely depend on the epoch number, as discussed later in detail.

Meanwhile, the method multiplexes S80 outputs of the executing instances in a single, totally ordered log 20 of the client requests. This single log 20 is maintained at each of the nodes 11, as schematically illustrated in FIG. 1.

In other words, disjoint partitions of client requests are assigned to respective instances of the LBTOB protocol, while outputs of the LBTOB instances are assignments of requests (or batches thereof) to respective sequence numbers in the log 20. So, each sequence number in the log 20 is eventually assigned a respective one of the client requests or a respective batch of such client requests.

However, contrary to the approach proposed in Mir-BFT, here the assignment of the disjoint partitions is deterministically decided by the system 1, rather than being decided by a primary node. All participating nodes may, nevertheless, agree on the assignment, as per the consensus protocol of the system 1. Yet, the assignment of the disjoint partitions of the client requests does not depend on a primary node, which precludes the risk of wrongdoing by a faulty primary node. Accordingly, single-primary bottlenecks are avoided. Fairness can nevertheless be guaranteed by assigning buckets 24 of client requests to different leaders throughout the epochs, as in embodiments discussed later in detail.

It is noted that Mir-BFT multiplexes PBFT instances leveraging a single replica in the role of epoch primary. In an embodiment, aspects of the present invention not only eliminate the need for a primary node but also provides a framework to multiplex any single leader protocol that can implement the present protocol. Of particular advantage is that the present protocol can be wrapped around any BFT protocol. Aspects of the present invention accommodate involvement of several BFT protocols. For instance, the LBTOB protocol(s) involved may be one or more practical Byzantine fault tolerance protocols (PBFTs) including the Raft leader-based protocol and other PBFT selected by one skilled in this field.

Aspects of the present invention are now described in detail, in reference to particular embodiments of the invention. To start with, the present methods preferably assign buckets of client requests to different leaders throughout computational epochs, in order to achieve fairness. An epoch typically corresponds to a set of consecutive sequence numbers, such that two successive epochs correspond to consecutive sets of consecutive sequence numbers.

Namely, client requests can be continually mapped (step S40) to subdomains of the domain spanned by the client requests. Doing so makes it possible to obtain buckets 24 of the client requests. Then, at each epoch, current buckets 24 of client requests are distributed S60 through the executing instances of the LBTOB protocol, using the deterministic function of the system's state. This makes it possible to obtain S60, at each epoch, new disjoint partitions of client requests, based on which respective instances of the LBTOB protocol concurrently execute S70. Meanwhile, outputs of the executing instances are still being multiplexed in the totally ordered log. Distributing buckets of requests through the executing instances makes it possible to prevent malicious leaders from censoring (i.e., not proposing) certain requests.

A bucket can be regarded as a list of pending client requests that belong to a certain subdomain. The subdomains are assigned to instances, so as to distribute rights for the leaders to propose requests. This, effectively, amounts to changing restrictions as to what requests the leaders can propose. Note, such instances are executed at all the nodes 11 of the system 1 (or a subset of said nodes) but leader nodes play a special role, inasmuch as such nodes lead respective instances and can propose requests' assignments. A leader node can propose an assignment of a sequence number by initiating the LBTOB protocol for that sequence number, in which case this leader will use the corresponding request as payload for a broadcast operation. A broadcast operation is performed upon a node invoking the LBTOB protocol. A broadcast operation precedes a delivery operation, according to which a node decides on the assignment of a request to a sequence number in the log 20.

Figure 3:
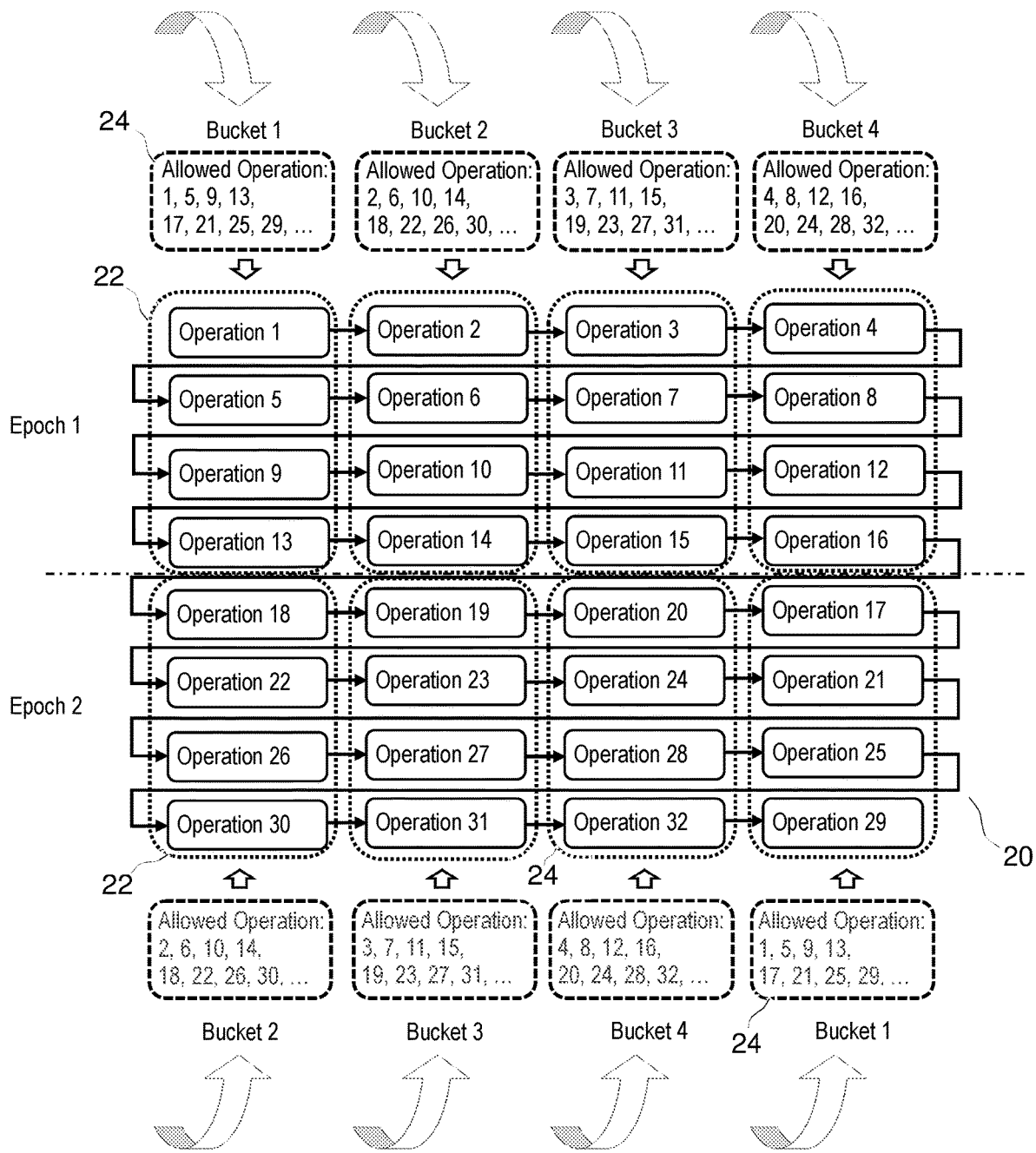
FIG. 3 is a diagram illustrating how operations (originating from client requests) are partitioned thanks to buckets of operations distributed through segments of a segmented log, as involved in embodiments.

The partition of requests can be carefully selected to maintain liveness, as well as to prevent redundant data duplication, as now discussed in reference to FIG. 3. Each position in the totally ordered log 20 corresponds to a unique sequence number, which is assigned a respective client request or a respective batch of client requests, as a result of the multiplexing step S80. The client requests effectively cause the nodes to perform operations (e.g., "Operation 1", "Operation 2", etc., in FIG. 3).

Now, such operations may efficiently be distributed thanks to segments 22 (of sequence numbers) assigned to respective instances of the LBTOB protocol. To that aim, the portion of the log 20 corresponding to each epoch is segmented S20 into non-overlapping segments 22 of sequence numbers, see step S20 of FIG. 4. Then, the obtained segments 22 are assigned to respective instances at step S30. Segmenting the log 20 provides a practical way of distributing the buckets 24 of requests. That is, the buckets 24 resulting from the on-going mapping process S40 are distributed S60 through the segments 22, at each epoch. So, the subdomains (as defined by outputs of the mapping function) are mapped onto segments 22 at each epoch. At each new epoch, buckets 24 of the client requests are re-distributed through the segments 22, such that new disjoint partitions of client requests are assigned, at each epoch, to LBTOB protocol instances for them to execute on new disjoint partitions of requests at each epoch. As noted earlier, the segments 22 may possibly be assigned to different types of LBTOB protocols, which is not possible with the Mir-BFT protocol.

The log 20 is segmented portion by portion, where each portion corresponds to a current epoch (first Epoch 1, then Epoch 2, etc., see FIG. 3). Thus, segments are continually created in the log 20. Such segments may possibly be dynamically designed and assigned, at each epoch, such that the sizes and numbers of segments may possibly vary from one epoch to the other. In simpler variants, however, the same static segmentation is used at each epoch, as assumed in FIG. 3. To that extent, the segmentation may be performed beforehand, i.e., before starting S10 computations corresponding to the first epoch. As per the segmentation process S20, an epoch can be regarded as a union of multiple segments 22 that forms a contiguous sub-sequence of the log 20.

The buckets 24 may be distributed through the segments in multiple ways. For example, the same buckets may be re-assigned to segments at each new epoch, so as for each segment to be assigned a different bucket at each epoch, as assumed in FIG. 3. This may for instance be achieved by rotating the buckets, as in embodiments discussed below. Yet, multiple buckets may possibly be assigned to a same segment, although a same bucket should preferably not be being assigned to multiple segments at a same epoch.

The bucket distribution is preferably performed S60 so as to prevent any client request (or any batch of requests) from being associated with more than one sequence number in the log 20. The goal is to maintain as much parallelism as possible in assigning the client requests (or batches thereof) to sequence numbers while avoiding request duplication, i.e., assigning a same request to more than one sequence number in the log 20, which has been shown to be detrimental to performance In practice, once a bucket is assigned to a segment (at a current epoch), any pending request in this bucket can come to be associated to a sequence number in this segment, provided this request has not already been assigned another sequence number of the log.

The distribution performed at step S60 involves the deterministic function evoked earlier. This function depends on the current system's state. I.e., one argument (or operand) of the function depends on the current system's state. This deterministic function may further depend on a nominal number of the buckets 24 to which it is applied, assuming that the function is applied to one bucket at a time to determine which segment this bucket is to be assigned to. That is, the function may have two operands, where the first operand depends on the system's state, while the second operand depends on the bucket nominal number. The output of the function corresponds to a nominal number of a segment, i.e., to one of non-overlapping segments 22 of an epoch. Note, nominal numbers may correspond to numeric IDs. In variants, the deterministic function may be designed so as to be applied to all buckets (it would then take all bucket IDs as input) and output corresponding segment numbers. In all cases, using such a deterministic function allows the distribution of buckets to be operated on a system level, rather than being decided by a given primary node (as in the Mir-BFT approach).

Which bucket is assigned to which segment may for example be determined as follows. The segment j to which a certain bucket i is to be assigned at a given epoch e may be calculated as $j = (i+e+K)$ modulo $N_s(e)$, where $K \epsilon Z$ and $N_s(e)$ is the total number of segments 22 at epoch e. In this example, the function depends on the system's state via the epoch number e. Note, it may equally depend on the previous system's state (i.e., e−1), which is still a function of the current system's state. As one understands, an infinity of variants may similarly be devised.

The obtained buckets 24 are preferably distributed S60 by re-assigning the same buckets 24 through the segments 22 at each epoch. This may be done so as to ensure that each segment is assigned a different bucket at each epoch. Note, however, that one may assign more than one buckets 24 per segment. To maintain the invariant of one bucket being assigned to one segment, all buckets are re-assigned at the same time, at the end of an epoch.

As evoked above, the buckets 24 can be re-assigned S60 by rotating them through the segments 22 (at each new epoch), as assumed in FIG. 3. Furthermore, this can be done so as to ensure that at least one of the segments 22, which is assigned to an instance with a correct leader (i.e., a non-faulty node) is assigned client requests from each of the buckets 24 throughout the several epochs. E.g., the leftmost segment of Epoch 1 may receive Operations 1, 5, 9, and 13, which are currently pending operations gathered S40 in Bucket 1 using a hash function. At the next epoch (Epoch 2), all buckets are rotated to the left, such that the leftmost segment of Epoch 2 receives Operations 18, 22, 26, and 30, which are currently pending operations from Bucket 2, now assigned to this segment. Operations 2, 6, 10, and 14, which also form part of Bucket 2, are not available anymore as they have been previously allotted to the second segment at Epoch 1. Similar assignments can be performed at each segment, at each epoch. Note, this process ideally ends up assigning a single request (operation), or a batch of requests, to each sequence number, as assumed in FIG. 3. Still, a same request will preferably not be assigned to distinct sequence numbers.

An easy way to ensure that operations from all buckets will eventually be processed by a correct node is to continually rotate the buckets through all segments 22. This way, the buckets 24 are rotated S60 so as to ensure that each of the segments 22 is assigned client requests in each of the buckets 24 throughout the successive epochs. This is done to prevent censoring. That is, the client request assignment is periodically changed, such that each bucket of requests can be guaranteed to be eventually assigned to a segment with a correct leader, assuming there is at least one such correct leader amongst the nodes 11.

As further seen in FIG. 3, each bucket 24 exhibit a certain pattern of operation numbers, where these operations correspond to client requests. This is because a hash function is used, which maps the input client requests to fixed-size values. The number of output values corresponds to the total number of buckets 24. Only four such buckets are shown in FIG. 3, which correspond to the total number of segments. However, a different number of buckets may be used. Plus, the number of segments may vary throughout the epochs.

As illustrated in FIG. 4, the client requests may be continually mapped S40 to subdomains, using such a hash function. In the present context, collisions in outputs of the hash function are exploited to group client requests into the buckets 24. I.e., the hash function is typically not a cryptographic hash function as it must ensure enough collisions, in correspondence with the desired number of buckets. Any mapping function may be contemplated at step S40, which makes it possible to map values from a large domain of requests to a small number of subdomains corresponding to the number of buckets. One may, for example, exploit certain digits of, e.g., numeric IDs of the client requests. In variants, random mappings may be relied on as well. In general, one will prefer mapping functions ensuring well-distributed requests, so as to obtain evenly distributed requests in each bucket.

This mapping S40 is performed as a background task, while concurrently performing steps of the present methods. A preferred embodiment is illustrated in FIG. 4. Namely, when starting S10 a new epoch, a corresponding portion of the log is segmented S20 to form non-overlapping segments that are assigned S30 to respective instances of the LBTOB protocol. Next, the current buckets are accessed at step S50, in view of distributing S60 them through the segments to obtain disjoint partitions of requests and execute S70 said instances on the obtained partitions. Outputs of these executions are assignments S80 of client requests (operations) to sequence numbers in the log. Once such operations have been suitably assigned to sequence numbers, they can be performed as usual, as per a consensus protocol of the system 1.

Each of the multiple instances of the LBTOB protocol is preferably executed S70 according to a carefully designed primitive, which is wrapped around the LBTOB protocol. Each instance interacts with other mechanisms at each node 11 according to this primitive, which can thus be regarded as a standardized interface, used by the many instances being concurrently executed.

Because buckets are defined over respective subdomains, this primitive is preferably designed to handle the client requests as messages defined over such subdomains. I.e., each message corresponds to one of the client requests (or a batch of such requests). The primitive may further be designed to allow each instance of the LBTOB protocol to order (upon execution) the messages belonging to a subdomain (corresponding to this instance) and terminate after delivering a finite number of messages in this subdomain.

Each subdomain can advantageously be extended to include a termination value, to ensure a proper termination condition. As said, each position in the log 20 corresponds to a unique sequence number. So, the primitive may further be designed in such a manner that any correct node is able, for each instance of the LBTOB protocol, to deliver one of the messages of the corresponding extended subdomain. This way, each sequence number of each segment 22 will be assigned one of the messages of the corresponding extended subdomain. As a result, each sequence number in the log 20 will be assigned S80 a message.

The primitive may further be designed to ensure one or more (or, preferably, each) of the following properties: integrity, agreement, no duplication, and eventual progress. To achieve the integrity property, the primitive is designed such that any message delivered by a correct node is a message of the extended domain of one of the instances of the LBTOB protocol. Concerning the agreement property, the primitive may further be designed to make sure that, if two messages delivered by respective correct nodes correspond to a same sequence number in the log 20, then the two messages are identical. As per the no duplication property, there the primitive may be such that no correct node can deliver an identical message for two or more different sequence numbers in the log 20. I.e., no correct node can deliver the same message more than once. Finally, eventual progress can be ensured by imposing that any broadcast message is a message that is eventually delivered by a correct node. More details are provided in Sect. 2.2.

Figure 5:
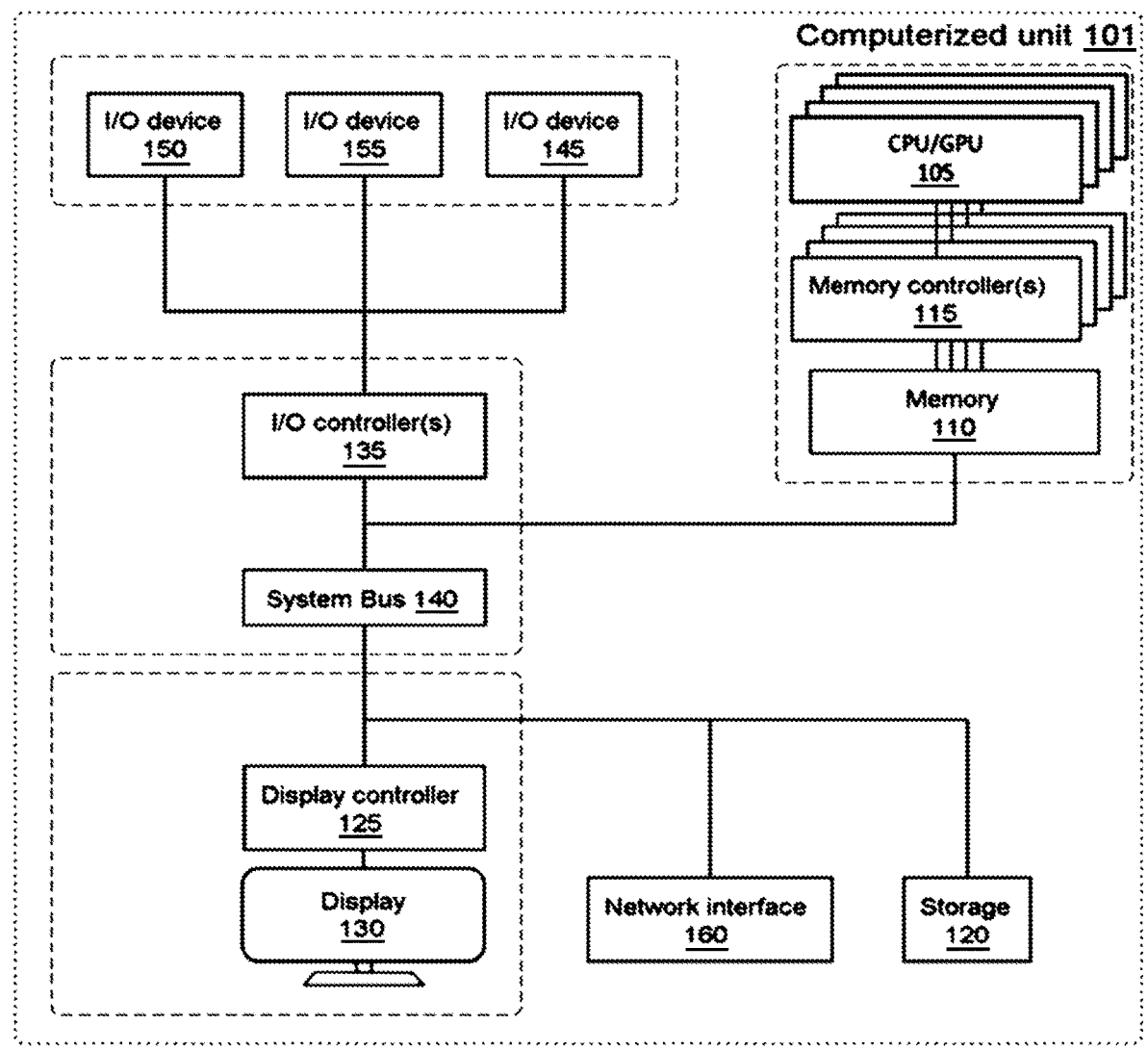
FIG. 5 schematically represents a general-purpose computerized unit, which may be used as a node of a distributed computing system, as in embodiments.

Next, according to another aspect, the invention can be embodied as a computer program product for executing a LBTOB protocol in a BFT system 1 as described earlier in reference to FIG. 1. This computer program product comprises a computer readable storage medium having program instructions embodied therewith. Such program instructions are executable by one or more processors 105 of a computerized unit 101 such as depicted in FIG. 5 to implement steps as described above in reference to the present methods. A suitable example of computerized unit 101 is described in detail in Sect. 3.1. Aspects of such computer program products are described in detail in section 3.2.

The above embodiments have been succinctly described in reference to the accompanying drawings and may accommodate a number of variants. Several combinations of the above features may be contemplated. Examples are given in the next section.

2. Particularly Preferred Embodiments

This section describes a generic construction to turn leader-based TOB protocols into scalable, leaderless protocols, which feature O(1) amortized common-case bit complexity. This construction is abbreviated as ISS (for Ideally Scalable SMR) in the following. This construction relies on a novel primitive, called Sequenced (Total Order) Broadcast, or SB for short, which is wrapped around LBTOB protocols such as PBFT, HotStuff, and Raft leader-based protocols, to make them scale. The proposed construction is general enough to accommodate most leader-based ordering protocols (BFT or CFT) and make them scale. Various implementations of this construction have been tested, which have shown improved throughput.

The primitive SB is a novel abstraction that allows a (leader-based) protocol instance to order messages belonging to a subset of the message domain (i.e., a subdomain) and terminates after delivering a finite number of messages in this subdomain. ISS multiplexes multiple instances of SB operating concurrently on a partition of the message domain, leading to disjoint partitions of the requests. The partition is carefully performed to maintain safety and liveness, as well as to prevent redundant data duplication. This construction can provide constant amortized bit communication complexity per node (which happens to be the right metric of interest for scalability, in the opinion of the present Inventors) in the synchronous case. The synchronous case is the prevalent mode of protocol operation, even for protocols designed for partial synchrony, allowing the system to scale without impact on throughput. This approach proves to be qualitatively better than previous modular efforts that do not provide careful partitioning and load balancing and hence cannot achieve the same scalability.

Aspects of the ISS implement total order by maintaining a log of (batches of) client requests at each peer. Each position in the log corresponds to a unique sequence number and ISS agrees on the assignment of request batches to each sequence number. The goal is to introduce as much parallelism as possible in assigning batches to sequence numbers, while avoiding request duplication (i.e., assigning the same request to more than one sequence number), which is detrimental to performance.

To this end, ISS subdivides the log into non-overlapping segments. Each segment corresponds to an independent instance of SB that has its own leader and executes concurrently with other SB instances. To prevent the leaders of two different segments from concurrently proposing the same request (and thus wasting resources), each segment is also assigned a different bucket, i.e., a subset of pending client requests. Each request hashes to exactly one bucket and no bucket is assigned to more than one segment at a time (i.e., at a same epoch). This results in spreading the load of proposing requests (or batches) among multiple leaders while preventing request duplication.

To prevent malicious leaders from censoring (i.e., not proposing) certain requests, ISS periodically changes the bucket assignment, such that each bucket is guaranteed to eventually be assigned to a segment with a correct leader, assuming at least one such correct leader exists in the system 1. To maintain the invariant of one bucket being assigned to one segment, all buckets are re-assigned at the same time. ISS therefore uses finite segments that it groups into epochs, i.e., unions of contiguous segments of the log. After all log positions within an epoch have been assigned requests (or batches), and thus no requests are "in flight", ISS starts processing the set of segments (with a different bucket assignment) that forms the next epoch, as illustrated in FIG. 3.

This new construction was implemented and deployed on a wide area network (WAN) spanning 16 different locations spread around the world, demonstrating ISS' improved performance in terms of throughput, using two different BFT protocols (PBFT and Hotstuff) and one CFT protocol (Raft).

The following describes the principles and abstractions underlying ISS in detail. Sect. 2.1 defines the system model, Sect. 2.2 discusses the sequenced broadcast (SB) abstraction, Sect. 2.3 describes how instances of SB are multiplexed, and Sect. 2.4 explains how to assign buckets to segments.

2.1. System Model

We assume a set P of node processes such that |P|=N. At most f of the nodes in S can be Byzantine, i.e., fail in some way, such that N≥3f+1. We further assume a set of client processes of arbitrary size, any of which can be Byzantine. Each process is identified by their public key, provided by a public key infrastructure.

Processes communicate through authenticated point-to-point channels. We assume an eventually synchronous network such that the communication between any pair of correct processes is asynchronous before an unknown global synchronization time (GST) when the communication becomes synchronous.

2.2 Sequenced Broadcast

Sequenced Broadcast (SB) is a variant of total order broadcast with explicit sequence numbers and an explicit set of allowed messages. Let M be a set of messages and S⊆N a set of sequence numbers. Only one designated sender process 6 can broadcast messages by invoking a function noted Broadcast(sn, m) with (sn, m)∈S×M. A sender process refers to a node that invokes the LBTOB protocol or, more precisely, an executing instance thereof. A deliver function Deliver(sn, m) is triggered at a correct process p when p delivers message m with sequence number sn. In certain cases, p is allowed to deliver a special value $m=\perp \notin M$.

Eventually, however, (intuitively when the system starts behaving synchronously, after GST), p will deliver actual messages $m \neq \perp$.

A (fully parametrized) instance of SB(σ, M, S) has the following properties:
  No Duplication: No correct process delivers (sn, m) more than once for each sn;
  Integrity: If σ is correct and a correct process delivers (sn, m), then σ broadcasts (sn, m) or $m=\perp$;
  Agreement: If two correct processes deliver, respectively, (sn, m) and (sn, m'), then m=m';
  Termination: If p is correct, then ∀sn∈S: ∃m∈M∪{⊥} such that p delivers (sn, m). The union M∪{⊥} can be referred to as an extended subdomain;
  Eventual Progress: Eventually, the following will hold: If σ is correct and σ broadcasts (sn, m), then some correct process delivers (sn', m), for some sn'∂S.

Sequenced Broadcast can be seen as a restricted form of TOB and thus can easily be obtained from existing TOB protocols. To implement SB, a leader-based protocol (like PBFT or HotStuff) only needs to let the initial leader be the dedicated sender σ, enforce that no other leader except for σ can propose a "fresh" value different from ⊥ and, in an infinite execution, σ becomes leader infinitely many times (e.g., by a round-robin leader assignment), as long as desired.

2.3 Multiplexing Instances of SB

ISS maintains, at each node, a log of ordered request batches. Each position in the log corresponds to a sequence number indicating an offset from the start of the log. ISS assembles (batches of) requests obtained from clients and agrees on the assignment of these request batches to positions in the log.

Figure 2:
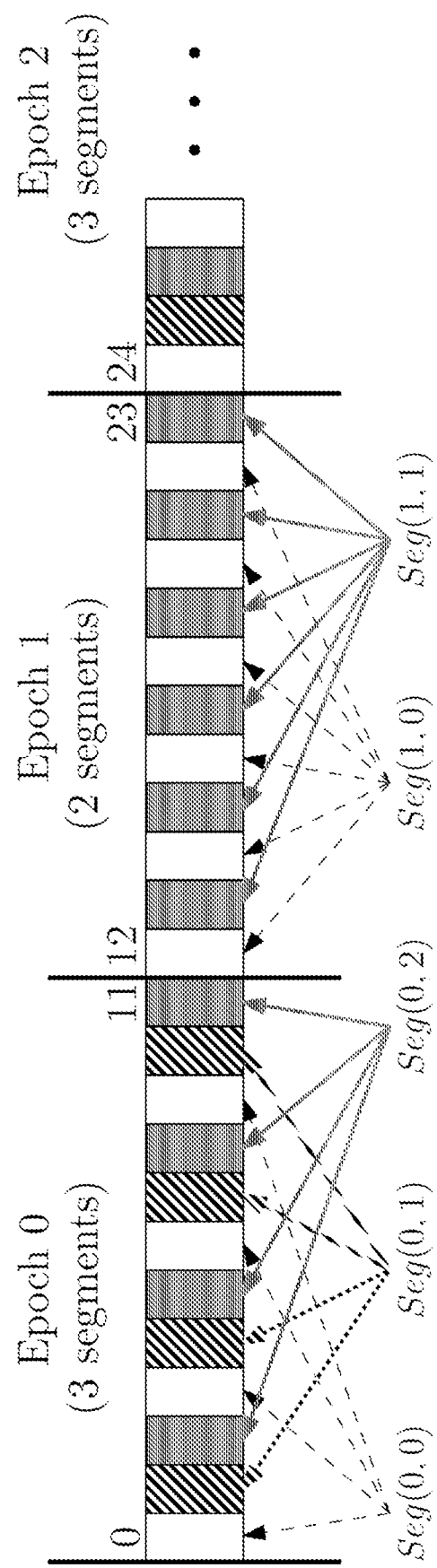
FIG. 2 is a diagram illustrating a log partitioned in epochs and segments, as in embodiments.

ISS proceeds in epochs identified by monotonically increasing integer epoch numbers, as in FIG. 3. Each epoch e>0 is associated with a set of consecutive sequence numbers Sn(e) between (and including) max(Sn(e−1))+1 and max(Sn(e)). Assume that Epoch 0 is the first epoch (contrary to what FIG. 3 may suggest) and starts with sequence number 0. Calculating max(Sn(e)) returns the highest sequence number of e. The mapping of sequence numbers to epochs is a function known to all nodes with the only requirement that it is monotonically increasing. More formally, for sn E Sn(e) and sn' E Sn(e'), the following must hold: e<e'⇒sn<sn'. Although this mapping may possibly be dynamically adapted at runtime, a fixed, constant epoch length is preferably used, for simplicity, as illustrated in FIGS. 2 and 3.

Epochs are processed sequentially, i.e., ISS first agrees on the assignment of batches to all sequence numbers in Sn(e) before starting to agree on the assignment of batches to sequence numbers in Sn(e+1).

Within an epoch, however, assignments of requests/batches to sequence numbers are agreed upon in parallel. Multiple leaders (selected by a suitable leader selection policy) concurrently propose request batches for different subsets of Sn(e). To this end, Sn(e) is further partitioned in segments and a different leader node is assigned to each segment. Call $Seg_i^e$, the subset of Sn(e) for which node i is the leader. This means that node i is responsible for proposing request batches to sequence numbers in $Seg_i^e$. Let numLeaders(e) be the number of nodes that are leaders in epoch e. Sequence numbers are associated with segments in a round-robin fashion. Note, any assignment of sequence numbers to segments is possible and leads to a correct algorithm. The round-robin fashion is preferred because it is the least likely to create gaps in the log and thus it minimizes request latency. Namely, for $0 \leq i \leq \text{numLeaders}(e)$, $\text{Seg}_i^e = \{sn \in Sn(e) | sn = i \mod \text{numLeaders}(e)\}$. This is exemplified in FIG. 2, which shows a log partitioned in epochs and segments, where each epoch is 12 sequence numbers long. The first epoch has three segments while the second epoch has only two. In FIG. 2, numLeaders(0)=3, numLeaders(1)=2, max(Sn(1))=23, and max($\text{Seg}_1^0$)=10.

In order not to waste resources on duplicate requests, the algorithm imposes that a request cannot be part of two batches assigned to two different sequence numbers. This is enforced at two levels: (i) within a segment and (ii) across segments.

For duplicate prevention within a segment, we rely on the fact that a single leader is responsible for proposing batches within each segment. A correct leader will propose (and a correct follower will accept) only batches with disjoint sets of request for each sequence number within a segment.

To prevent duplication across segments, we partition the set of all possible requests into buckets (using a hash function) and enforce that only requests from different buckets can be assigned to sequence numbers belonging to different segments (see section 2.4). To each segment, we assign a bucket, such that each bucket is assigned to exactly one segment within each epoch.

In summary, a segment is defined by the tuple (e, i, $\text{Seg}_i^e$, B), where e is the segment's epoch, i is its leader, $\text{Seg}_i^e \subseteq Sn(e)$ is a set of sequence numbers, and B is a set of buckets assigned to the segment.

Let batches(B) be the set of all possible batches consisting of requests in buckets in B. For each segment (e, i, $\text{Seg}_i^e$, B), we use an instance SB(i, batches(B), $\text{Seg}_i^e$) of Sequenced Broadcast. So, leader i proposes a batch b∈batches(B) for sequence number sn∈$\text{Seg}_i^e$ if i executes Broadcast(sn, b) at the corresponding instance of SB. A batch b commits with sequence number sn (and is added to the log at the corresponding position) at node n when the corresponding instance of SB triggers Deliver(sn, b) at node n.

During epoch e, all nodes that are leaders in e simultaneously propose request batches for sequence numbers in their corresponding segments. ISS multiplexes all segments into the single common log as shown in FIG. 2. Each node thus executes numLeaders(e) logical SB instances simultaneously, while being a leader for at most one of them.

Epoch e ends and epoch (e+1) starts when all sequence numbers in Sn(e) have been committed. Nodes keep the old instances active until all corresponding sequence numbers become part of a stable checkpoint; we can use standard PBFT style checkpointing. This ensures liveness of all correct nodes, even slow nodes, which might not have actively taken part in the agreement.

2.4 Assigning Buckets to Segments

ISS partitions the request hash space into buckets, which it assigns to leaders/segments and rotates the bucket assignment across epochs. Assigning a bucket to a leader i means assigning a bucket to a segment for which node i is the leader. At any point in time, a leader can include in its batch only requests from its corresponding segment. A comparable approach has been used in Mir-BFT to counter request duplication and censoring attacks, although the assignment was decided by a primary node in that case, instead of being decided on a system level.

The set of buckets, B, is a partition of the request hash space. All buckets b ∈ B have (approximately) equal size, where the number of buckets is a configuration parameter.

The assignment of buckets to leaders/segments is fixed during an epoch and changes at each epoch transition. We denote by activeBuckets(e, i)⊆$\mathcal{B}$ the set of buckets assigned to leader i at epoch e.

To ensure that every bucket is eventually assigned to a correct leader, ISS rotates the bucket assignment on every epoch transition as follows. For epoch e, an initial set of buckets is assigned to each node in a round-robin fashion. Note, a set of buckets can initially be assigned even to nodes that are not leaders in epoch e; they are later re-assigned to leaders. Let initBuckets(e, i)⊆$\mathcal{B}$ be the set of buckets initially assigned to each node i, $0 \leq i < |\mathcal{N}|$ in epoch e. Thus, initBuckets(e, i)={b∈$\mathcal{B}$ |(b+e)=i mod|$\mathcal{N}$|}.

To account for not all nodes belonging to epLeaders(e), let extraBuckets(e) be the set of buckets the initial assignment attributes to non-leaders. I.e., extraBuckets(e)={b∈$\mathcal{B}$ |∃i: i∉epLeaders(e)∧b∈initBuckets(e, i)}.

Finally, the extra buckets can be re-distributed in a round-robin fashion to the leaders of epoch e. Let l(e, k), $0 \leq k < \text{numLeaders}(e)$ be the k-th leader (in lexicographic order) in epoch e. The activeBuckets(e, l(e, k)) of the k-th leader in e are thus defined as activeBuckets(e, l(e, k))=initBuckets(e, l(e, k))∪{b∈extraBuckets(e)|(b+e)∝k mod numLeaders(e)}.

With this approach, all buckets are assigned to leaders and every node is eventually assigned every bucket at least through the initial bucket assignment. ISS ensures liveness as long as, in an infinite execution, it occurs infinitely many times that a correct node is leader for at least |$\mathcal{N}$| consecutive epochs. This condition can be fulfilled by having all nodes initially acting as leaders and then removing nodes from the leader set that are suspected to be faulty. A node removed from the leader set may eventually be re-included to account for false suspicions due to, for example, partitions or DoS attacks. Any suitable leader selection policy can be used to preserve liveness by guaranteeing that, eventually, one or more correct nodes will be leaders forever.

3. Technical Implementation Details 3.1 Computerized Units and Systems

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

For instance, FIG. 5 schematically represents a computerized unit 101 (e.g., a general or specific-purpose computer), which may possibly interact with other, similar units 101, to be able to perform steps according to the present methods.

In exemplary embodiments, in terms of hardware architecture, as shown in FIG. 5, each unit 101 includes at least one processor 105, and memory 110 coupled to a memory controller 115. Several processors (CPUs, and/or GPUs)

may possibly be involved in each unit 101. To that aim, each CPU/GPU may be assigned a respective memory controller, as known per se.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software instructions. The processors 105 can be any custom made or commercially available processor(s). In general, they may involve any type of semiconductor-based microprocessor (in the form of a microchip or chip set), or generally any device for executing software instructions.

The memory 110 typically includes volatile memory elements (e.g., random-access memory), and may further include nonvolatile memory elements. Moreover, the memory 110 may incorporate electronic, magnetic, optical, and/or other types of storage media. External (i.e. secondary or auxiliary) storage 120 is normally available, which is not directly accessible by the processing means 105, as usual.

Software in memory 110 may include one or more separate programs, each of which includes executable instructions for implementing logical functions. In the example of FIG. 5, instructions loaded in the memory 110 may include instructions arising from the execution of the computerized methods described herein in accordance with exemplary embodiments. The memory 110 may further load a suitable operating system (OS). The OS essentially controls the execution of other computer programs or instructions and provides scheduling, input-output control, file and data management, memory management, and communication control and related services.

Possibly, a conventional keyboard and mouse can be coupled to the input/output controller 135. Other I/O devices 145, 150, 155 may be included. The computerized unit 101 can further include a display controller 125 coupled to a display 130. Any computerized unit 101 will typically include a network interface or transceiver 160 for coupling to a network, to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

3.2 Computer Program Products

The present invention may be a method and/or a computer program product at any possible technical detail level of integration. The computer program product may include a computer readable storage medium (or media) having computer readable program instructions thereon for causing a processor to carry out aspects of the present invention. The computer program product may include a thereon for causing a processor to carry out aspects of the present invention. instruction-set-architecture (ISA) instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
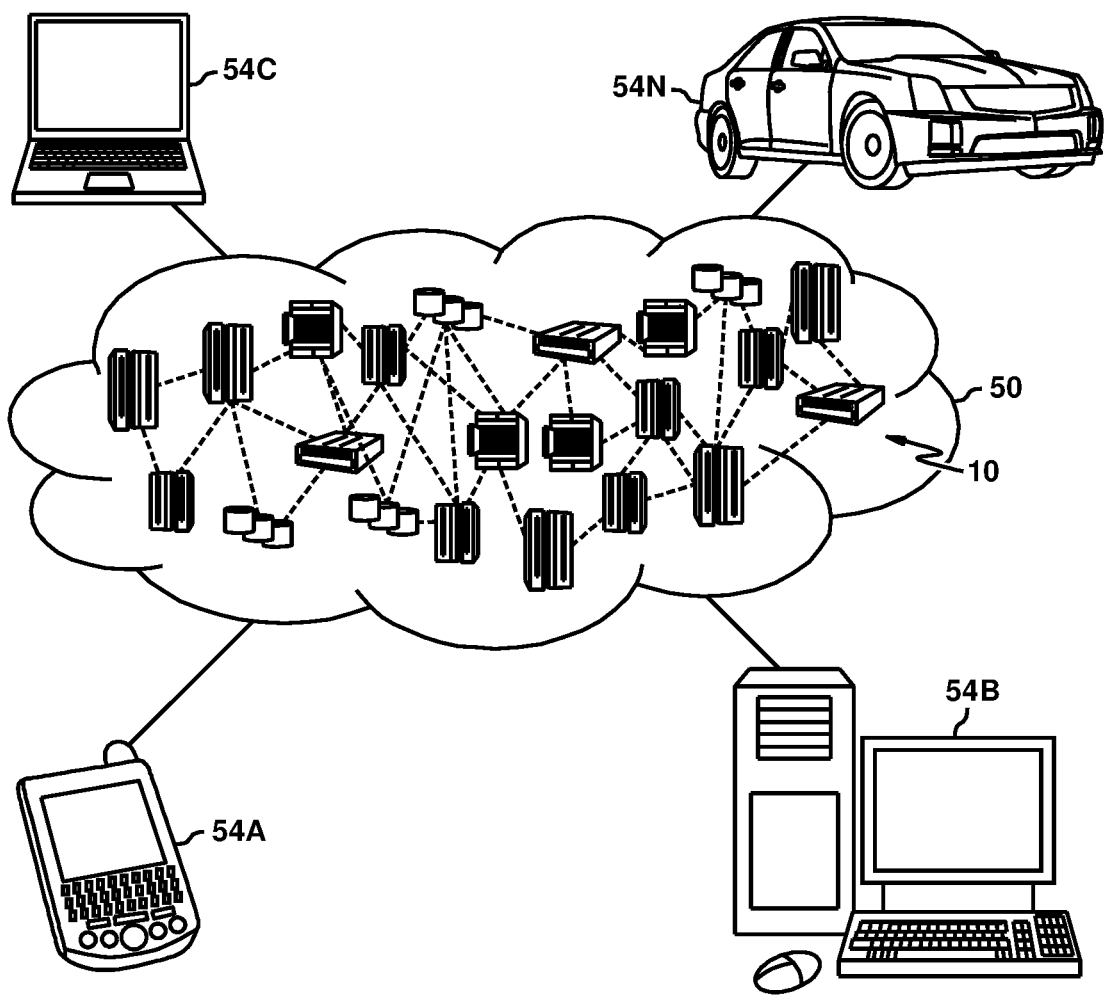
FIG. 6 depicts a cloud computing environment according to an embodiment of the present invention.
Figure 7:
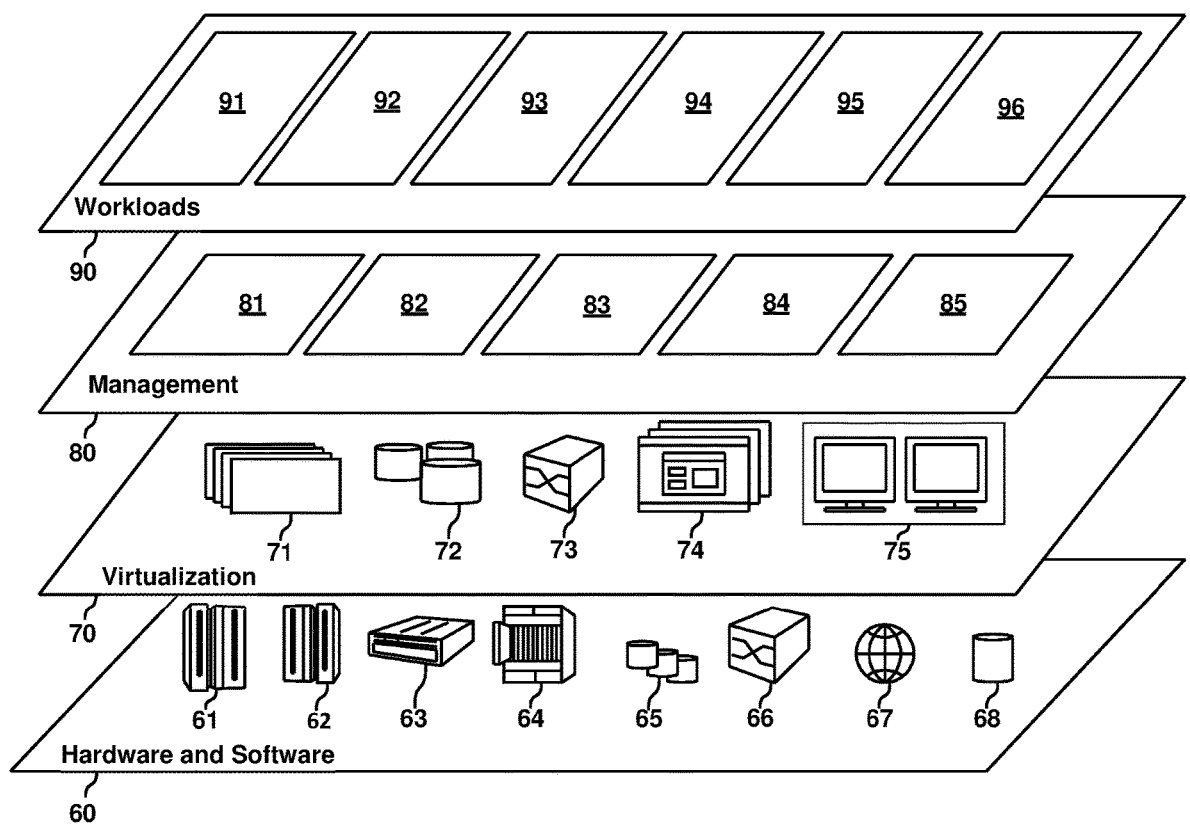
FIG. 7 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and executing leader-based, total order broadcast (LBTOB) protocols in Byzantine fault-tolerant, distributed computing systems 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of executing a leader-based, total order broadcast protocol, or LBTOB protocol, in a Byzantine fault-tolerant, distributed computing system of nodes configured to process client requests, wherein the method comprises:
   concurrently executing multiple instances of the LBTOB protocol at the nodes, on respective disjoint partitions of the client requests, wherein the disjoint partitions are assigned to said instances using a deterministic function of a state of the system; and
   multiplexing outputs of the executing instances in an ordered log of the client requests, wherein the ordered log is maintained at each of the nodes;
   mapping the client requests to subdomains of a domain of the requests, so as to obtain buckets of the client requests; and
   at each epoch of several epochs, distributing the obtained buckets of the client requests through said instances, using said deterministic function, so as to obtain the disjoint partitions of the client requests on which the respective instances concurrently execute, wherein each position in the ordered log corresponds to a unique sequence number, which is assigned a respective one of the client requests, or a respective batch of the client requests, as a result of multiplexing said outputs of the executing instances; and the method further comprises segmenting a portion of the ordered log corresponding to said each epoch into non-overlapping segments of sequence numbers and assigning the segments to respective ones of the instances; and the obtained buckets are distributed through said instances by distributing the buckets through the assigned segments at said each epoch, so as to obtain said disjoint partitions of the client requests.

2. The method according to claim 1, wherein the buckets of the client requests are distributed so as to prevent any one of the client requests, or batches thereof, from being associated with more than one of the sequence numbers in the ordered log.

3. The method according to claim 1, wherein said deterministic function has two operands, including a first operand that depends on the state of the system at said each epoch and a second operand that depends on a nominal number of one of the buckets, the deterministic function being applied to one of the buckets at a time, whereby an output of the deterministic function corresponds to a nominal number of one of non-overlapping segments of said portion.

4. The method according to claim 1, wherein distributing the obtained buckets comprises re-assigning the obtained buckets through the segments at said each epoch.

5. The method according to claim 2, wherein the buckets are re-assigned by rotating them through the segments at said each epoch, so as to ensure that at least one of the segments assigned to a respective one of the instances with a correct leader is assigned client requests in each of the buckets throughout the several epochs.

6. The method according to claim 5, wherein the buckets are rotated so as to ensure that each of the segments is assigned client requests in each of the buckets throughout the several epochs.

7. The method according to claim 1, wherein the client requests are mapped to said subdomains using a hash function mapping input client requests to fixed-size values, where a number of the fixed-size values corresponds to a total number of the buckets.

8. The method according to claim 1, wherein each of the multiple instances of the LBTOB protocol is executed according to a distributed computing primitive that is wrapped around the LBTOB protocol.

9. The method according to claim 8, wherein said distributed computing primitive is designed to
handle said client requests as messages defined over said subdomains, whereby each of the messages corresponds to one of the client requests or a batch of requests of the client requests, and
each of the instances of the LBTOB protocol, upon executing, ordering messages belonging to a corresponding one of the subdomains and terminate after delivering a finite number of the messages in said corresponding one of the subdomains.

10. The method according to claim 9, wherein a subdomain of each of the instances of the LBTOB protocol is extended to include a termination value.

11. The method according to claim 9, wherein each position in the ordered log corresponds to a unique sequence number, and
the distributed computing primitive is further designed such that any correct node of said nodes is able, for each of the instances of the LBTOB protocol, to deliver one of the messages of the extended subdomain of this instance, such that each sequence number in the log will be assigned one of the messages of the extended subdomain of one of the instances.

12. The method according to claim 9, wherein the distributed computing primitive is further designed such that any message delivered by a correct node is a message of the extended domain of one of the instances.

13. The method according to claim 9, wherein the distributed computing primitive is further designed such that if two messages delivered by respective correct nodes of the nodes correspond to a same sequence number in the log, then the two messages are identical.

14. The method according to claim 9, wherein the distributed computing primitive is further designed such that no correct node of the nodes can deliver a same one of the messages for two or more different ones of the sequence numbers in the log.

15. The method according to claim 9, wherein the distributed computing primitive is further designed such that any broadcast message is a message that is eventually delivered by a correct node.

16. The method according to claim 8, wherein the LBTOB protocol is one of:
the practical Byzantine fault tolerance protocol; and
the Raft leader-based protocol.

17. A system of executing a leader-based, total order broadcast (LBTOB) protocol, in a Byzantine fault-tolerant, distributed computing system of nodes configured to process client requests, which comprises:
a computer system comprising a computer readable storage medium having program instructions embodied therewith, the program instructions executable by a computer to cause the computer to:
concurrently execute multiple instances of the LBTOB protocol at the nodes, on respective disjoint partitions of the client requests, wherein the disjoint partitions are assigned to said instances using a deterministic function of the state of the system; and
multiplex outputs of the executing instances in a single, totally ordered log of the client requests, wherein the single log is maintained at each of the nodes;
map the client requests to subdomains of a domain of the requests, so as to obtain buckets of the client requests; and
at each epoch of several epochs, distribute the obtained buckets of the client requests through said instances, using said deterministic function, so as to obtain the disjoint partitions of the client requests on which the respective instances concurrently execute, wherein each position in the ordered log corresponds to a unique sequence number, which is assigned a respective one of the client requests, or a respective batch of the client requests, as a result of multiplexing said outputs of the executing instances; and
the system further causes the computer to segment a portion of the ordered log corresponding to said each epoch into non-overlapping segments of sequence numbers and assigning the segments to respective ones of the instances; and the obtained buckets are distributed through said instances by causing the computer to distribute the buckets through the assigned segments at said each epoch, so as to obtain said disjoint partitions of the client requests.

18. A computer program product for executing a leader-based, total order broadcast (LBTOB) protocol, in a Byzantine fault-tolerant, distributed computing system of nodes configured to process client requests, the computer program product comprising a computer readable storage medium having program instructions embodied therewith, the program instructions executable by one or more processors, to:

concurrently execute multiple instances of the LBTOB protocol at the nodes, on respective disjoint partitions of the client requests, wherein the disjoint partitions are assigned to said instances using a deterministic function of the state of the system; and multiplex outputs of the executing instances in a single, totally ordered log of the client requests, wherein the single log is maintained at each of the nodes;

map the client requests to subdomains of a domain of the requests, so as to obtain buckets of the client requests; and at each epoch of several epochs, distribute the obtained buckets of the client requests through said instances, using said deterministic function, so as to obtain the disjoint partitions of the client requests on which the respective instances concurrently execute, wherein each position in the ordered log corresponds to a unique sequence number, which is assigned a respective one of the client requests, or a respective batch of the client requests, as a result of multiplexing said outputs of the executing instances; and the computer program product further comprising program instruction to segment a portion of the ordered log corresponding to said each epoch into non-overlapping segments of sequence numbers and assigning the segments to respective ones of the instances; and the obtained buckets are distributed through said instances by program instructions to distribute the buckets through the assigned segments at said each epoch, so as to obtain said disjoint partitions of the client requests.

* * * * *